United States Patent
Zutshi

(10) Patent No.: US 10,525,599 B1
(45) Date of Patent: Jan. 7, 2020

(54) AUTOMATIC DETECTION OF SCREEN AREA AND CAMERA ASSISTED MOVEMENT OF ROBOTIC ARM

(71) Applicant: Amazon Technologies, Inc., Seattle, WA (US)

(72) Inventor: Samir Zutshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 15/648,284

(22) Filed: Jul. 12, 2017

(51) Int. Cl.
*G05B 15/00* (2006.01)
*G05B 19/00* (2006.01)
*B25J 9/16* (2006.01)
*G06K 9/46* (2006.01)
*G06K 9/62* (2006.01)
*G06K 9/00* (2006.01)

(52) U.S. Cl.
CPC ........ *B25J 9/1697* (2013.01); *G06K 9/00664* (2013.01); *G06K 9/4638* (2013.01); *G06K 9/6202* (2013.01)

(58) Field of Classification Search
CPC . B25J 9/1697; G06K 9/00664; G06K 9/4638; G06K 9/6202
See application file for complete search history.

(56) References Cited

U.S. PATENT DOCUMENTS

| | | | |
|---|---|---|---|
| 2009/0265035 A1* | 10/2009 | Jenkinson | B25J 9/1697 700/259 |
| 2016/0167238 A1* | 6/2016 | Matthews | G01M 99/008 73/118.01 |
| 2016/0187876 A1* | 6/2016 | Diperna | H04B 17/11 702/81 |
| 2016/0354929 A1* | 12/2016 | Ishige | B25J 9/1697 |
| 2017/0038757 A1* | 2/2017 | Novakovic | B25J 9/1697 |
| 2018/0004188 A1* | 1/2018 | Yamaguchi | B25J 9/1697 |
| 2018/0232583 A1* | 8/2018 | Wang | G06K 9/00812 |

* cited by examiner

*Primary Examiner* — Harry Y Oh
(74) *Attorney, Agent, or Firm* — Knobbe Martens Olson & Bear LLP

(57) ABSTRACT

Systems, methods, and computer-readable media are described for instructing a robotic arm to perform various actions on a touch-sensitive display screen of a mobile device based on captured images of the display screen. A camera can capture an image of the display screen while the mobile device is mounted in a mounting station with the display screen facing the camera, and the captured image can be analyzed to determine the relationship between the pixel locations in the image captured by the camera and the physical locations to which the robotic arm can be instructed to move. Based on the relationship, the system can instruct the robotic arm to touch and activate various on-screen objects displayed on the display screen of the mobile device based on the pixel locations of such on-screen objects in the images captured by the camera.

20 Claims, 5 Drawing Sheets

AUTOMATIC DETECTION OF SCREEN AREA AND CAMERA ASSISTED MOVEMENT OF ROBOTIC ARM

BACKGROUND

The use of robots to perform repetitive tasks has increased over the years. A robot can be pre-programmed to perform actions that are highly repetitive and/or require utmost precision (e.g., at the production line for automobiles and electronics) or actions that are too dangerous for humans (e.g., bomb disposal or exploration of other planets). However, a pre-programmed robot may fail to perform a desired action if the robot encounters an unforeseen circumstance. This drawback has limited the use of robots in fields that require human intelligence and decision-making ability.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Generally described, aspects of the present disclosure relate to instructing a robotic arm to perform various tasks. More specifically, aspects of the present disclosure are directed to systems, methods, and computer-readable media related to calibrating a robotic arm with respect to a camera, and instructing the robotic arm to perform camera-assisted actions on a touch-sensitive display screen, such as the screen of a mobile device.

The robotic arm can be pre-programmed to perform a series of actions on a mobile device to test the performance of the mobile device. For example, the robotic arm can be programmed to move to a specific predefined position and touch the display screen of the mobile device at the predefined position to launch a mobile application installed on the mobile device, and perform a series tasks such as search for a video, play a video, upload a file, etc. However, the problem with pre-programmed actions is that when the mobile device or the robotic arm moves relative to each other, the pre-programmed actions that rely on hard-coded positions (e.g., positions coded using fixed coordinate values in the robotic arm or real world space) will no longer work as intended (e.g., may activate the wrong button, open the wrong application, etc.). In addition, the on-screen locations of the various user interface elements may change (e.g., home button is moved a few millimeters to the right, the mail application is moved one slot to the left, etc.) due to application updates and other factors, further reducing the effectiveness of these pre-programmed actions.

In the present disclosure, various techniques for calibrating the robotic arm with respect to the target object on which the actions are performed (a mobile device in this example) and with respect to other peripheral devices (e.g., a camera configured to capture images of the mobile device and the robotic arm) are described. Further, by utilizing a camera to correctly identify the target location to which the robotic arm is to be instructed to move, some or all of the use of hard-coded position values can be eliminated. In some embodiments, transformation parameters are calculated to switch between the camera space (e.g., pixel locations in the image captured by the camera) and the robotic arm space (e.g., the positions to which the robotic arm can be instructed to move), such that the actions to be performed by the robotic arm can be further assisted by the information included in the images captured by the camera (e.g., whether the location of the on-screen icon has changed, whether the screen is displaying a pop-up window, whether the screen is off, etc.). By utilizing these features described in the present disclosure, the use of robots can be expanded to a greater number of applications.

Perspective View of Camera-assisted Robotic Arm System

Figure 1:
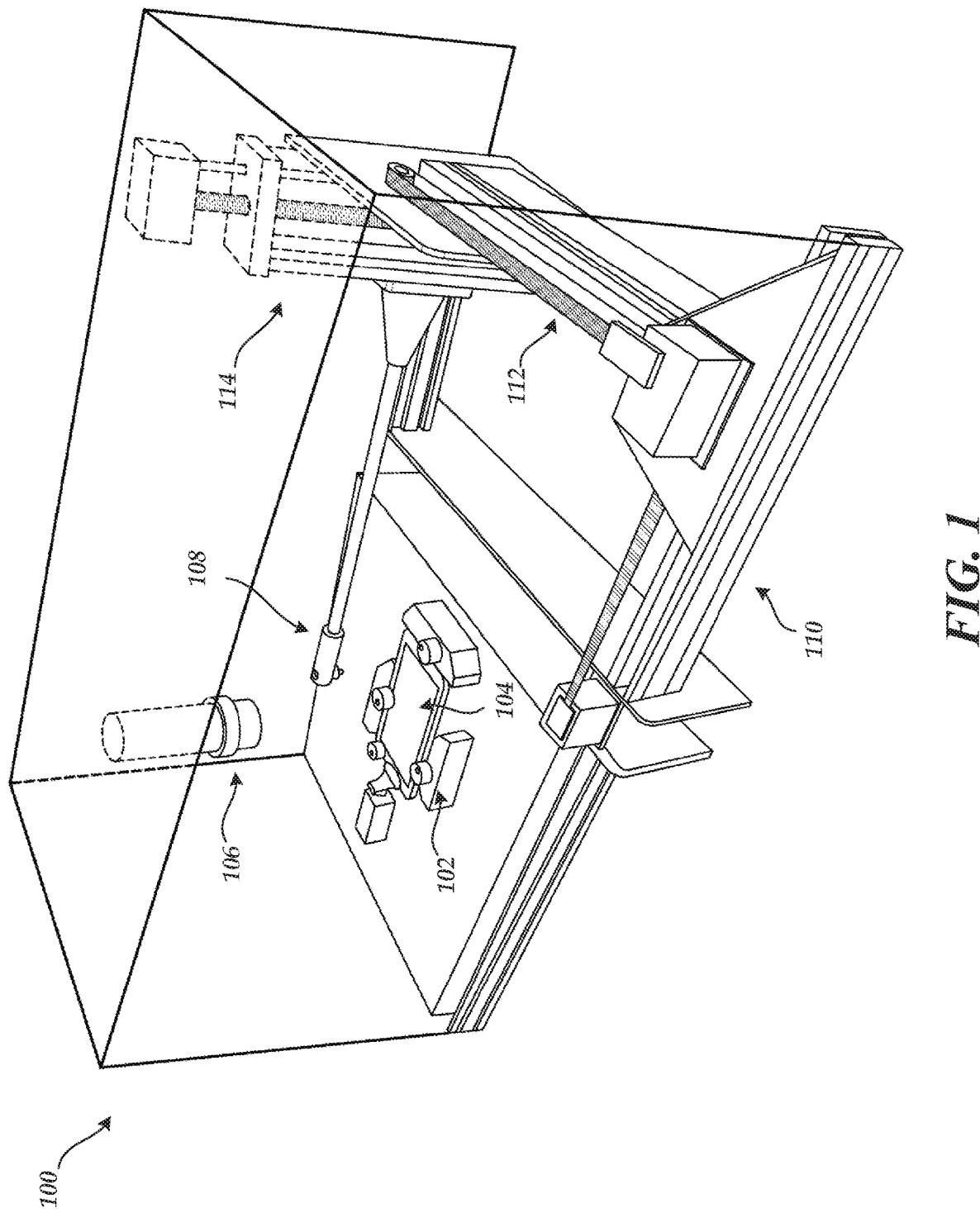
FIG. 1 is a perspective view of the camera-assisted robotic arm system in accordance with aspects of the present disclosure.

FIG. 1 depicts a perspective view of a camera-assisted robotic arm system 100 (also referred to herein as "system 100") that implements aspects of the present disclosure. Although not shown in FIG. 1, the camera-assisted robotic arm system 100 may include a computing device connected to one or more components shown in FIG. 1. The system 100 includes a mobile device mounting station 102 configured to physically hold a mobile device 104, a camera 106 configured to capture images of the mobile device 104, a robotic arm 108, a longitudinal rail 110, a latitudinal rail 112, and a vertical rail 114. The robotic arm 108 is configured to move along the rails 110, 112, and 114.

Mobile Device Mounting Station

The mobile device mounting station 102 can physically hold the mobile device 104 in various different positions. For example, the mobile device mounting station 102 can hold the mobile device 102 such that the bottom left corner of the display screen of the mobile device 104 is aligned with a predefined reference point. The mobile device mounting station 102 may include an adjustment guide that can help a human operator mount the mobile device 104 in a designated position.

Mobile Device

The mobile device 104 may include a touch-sensitive display screen. In some embodiments, the mobile device 104 is mounted in the mobile device mounting station 102 such that the touch-sensitive display screen of the mobile device 104 is facing the camera 106. The mobile device 104 may have a plurality of mobile applications installed thereon. In some embodiments, the performance of such mobile applications can be tested using the robotic arm 108. While FIG. 1 depicts a mobile device such as a mobile phone or tablet computing device, and a mobile device is often used as an example herein, it will be appreciated that the mounting station may be configured to hold a stand-alone display screen that is in communication with a computer (such as by being wired to a desktop computer, or communicating wirelessly with another computing device) that is not necessarily contained within the same housing as the screen. Accordingly, the camera-assisted robotic arm system illustrated in FIG. 1 and others described herein are not limited to performing robotic actions with respect to a self-contained mobile device, but may be equally capable of performing robotic actions with respect to a screen that displays the output of another type of computing device (e.g., other than a mobile device), whether or not the entire computing system (e.g., the computing device and the associated display screen) is physically located within the mounting station.

Camera

The camera 106 can capture images of the mobile device 104 while the mobile device 104 is mounted in the mobile device mounting station 102. The camera 106 can be any set of image sensing components that can generate images depicting the mobile device 104 when the mobile device 104 is mounted in the mobile device mounting station 102. Although the camera 106 is used as an example capture device, any other image capture device can be used, such as a capture card that can capture images and/or videos directly from the mobile device 104 or from another device that can generate images and/or videos of the display screen of the mobile device 104.

In some embodiments, the camera 106 is mounted at a predefined distance away from the mobile device mounting station 102 in a direction in which the mobile device 104 is configured to face when mounted in the mobile device mounting station 102. In some embodiments, the distance between the camera 106 and the mobile device mounting station 102 (or the mobile device 104 mounted therein) is adjustable and can be set to any distance value.

In some embodiments, the camera 106 is positioned such that the direction in which the camera 106 faces is perpendicular to the display screen of the mobile device 104 when the mobile device 104 is mounted in the mobile device mounting station 102. In some embodiments, the camera 106 faces the mobile device mounting station 102 but the direction in which the camera 106 faces is not perpendicular to the display screen of the mobile device 104 when the mobile device 104 is mounted in the mobile device mounting station 102. In some cases, the camera 106 is fixed to the ceiling of the frame of the system 100. Alternatively, the camera 106 is adjustable such that the camera 106 is moved along the ceiling and/or towards or away from the mobile device 104. Although the camera 106 is shown in FIG. 1 as being attached to the ceiling of the frame of the system 100, the camera 106 may be mounted in any other manner that allows the camera 106 to capture images of the mobile device 104.

Robotic Arm

The robotic arm 108 includes a tip that is capable of touching the display screen of the mobile device 104 when the robotic arm 108 is moved. The tip may be configured to activate a capacitive touchscreen (or any other type of touchscreen). In some cases, the phrase "robotic arm" as used in the present disclosure refers to the robotic arm 108. In other cases, the phrase as used in the present disclosure refers to the robotic arm 108 as well as the mechanism for moving the robotic arm 108, such as the rails 110, 112, and 114. Although the robotic arm 108 of FIG. 1 includes a rod mounted to the rails 110, 112, and 114 for moving the robotic arm 108, the robotic arm 108 can include any other mechanisms. For example, the robotic arm 108 may be a pad mounted above the mobile device 104 and having mechanical fingers configured to tap various portions of the display screen of the mobile device 104. As another example, the robotic arm 108 may be any mechanical arm with at least two or three degrees of freedom. As another example, the robotic arm 108 may be any touch-capable device that can touch some or all portions of the display screen of the mobile device 104. As another example, the robotic arm 108 may be any robot having its own movement system that can be mapped to the coordinate system corresponding to the display screen of the mobile device 104. In some cases, the phrase may refer to a non-robot that can perform the various tasks described herein as being performed by the robotic arm 108. For example, the robotic arm can be a gantry arm. In some embodiments, the robotic arm 108 is part of a cartesian robot, a gantry robot, a cylindrical robot, a spherical robot, an anthropomorphic robot, or the like.

Rails

The longitudinal rail 110 allows the robotic arm 108 to move in the longitudinal direction (e.g., towards and away from the mobile device 104). The latitudinal rail 112 allows the robotic arm 108 to move in the latitudinal direction (e.g., along a direction perpendicular to the longitudinal direction and parallel to the surface of the display screen of the mobile device 104 when the mobile device 104 is mounted in the mobile device mounting station 102). The vertical rail 114 allows the robotic arm 108 to move in the vertical direction (e.g., direction perpendicular to the surface of the display screen of the mobile device 104 when the mobile device 104 is mounted in the mobile device mounting station 102). Although the rails 110, 112, and 114 are shown in FIG. 1, any other mechanisms for moving the robotic arm 108 may be used instead. For example, different types of robotic arms may utilize different mechanisms for moving the robotic arm 108.

Camera-Robot Calibration Routine

Figure 2:
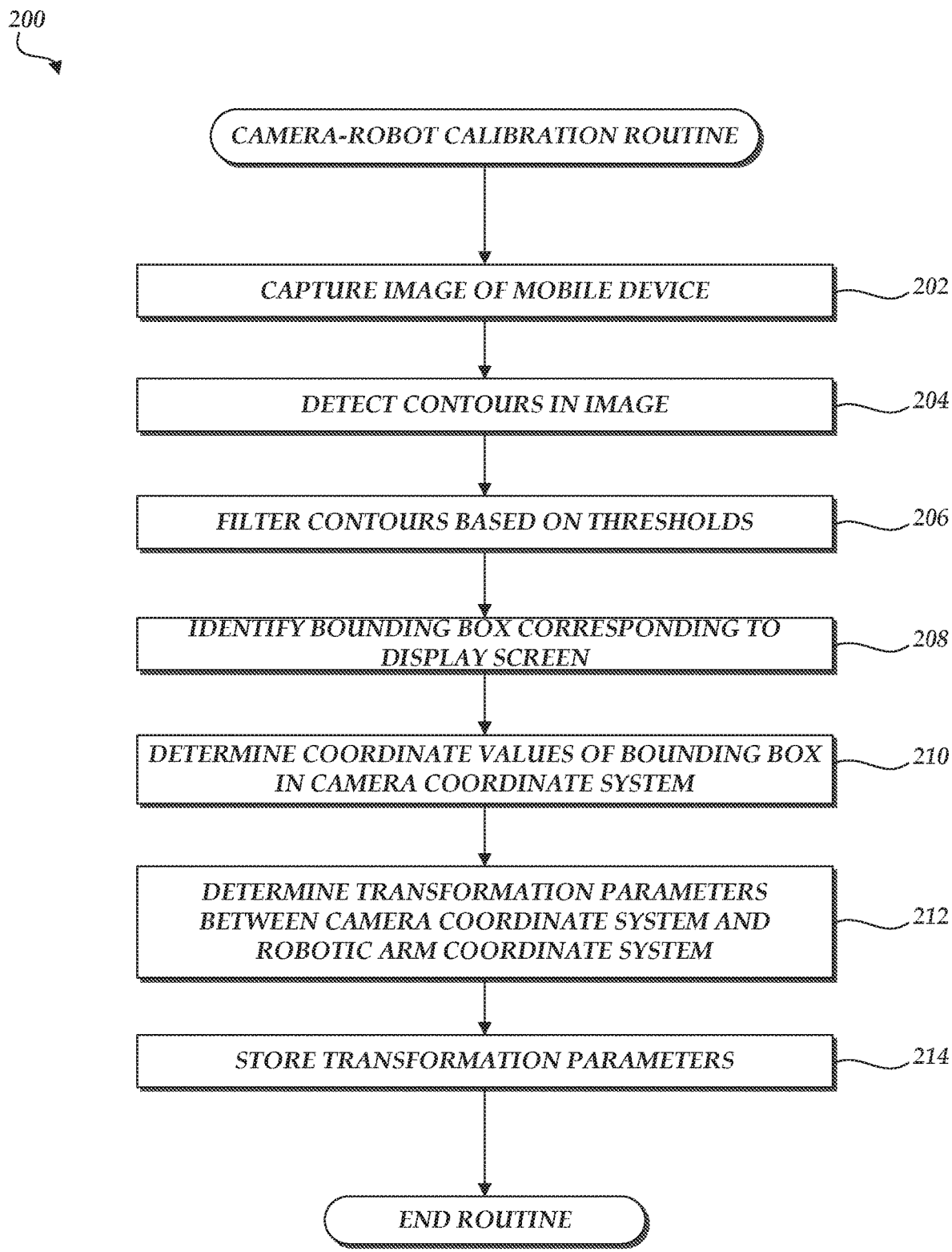
FIG. 2 is a flow diagram depicting a camera-robot calibration routine in accordance with aspects of the present disclosure.

With reference now to FIG. 2, an example camera-robot calibration routine 200 will be described. The example routine 200 may be carried out, for example, by the mobile device experiment platform 500 of FIG. 5 (or one or more components thereof), which will be described below. For convenience, the steps of the example routine 200 are described as being performed by a system.

At block 202, the system captures an image of the mobile device 104 mounted in the mobile device mounting station 102. The captured image may include a depiction of the display screen of the mobile device 104. In some embodiments, the system captures the image while the mobile device 104 is turned on and while the display screen of the mobile device 104 is displaying one or more on-screen objects or images. For example, the display screen, at the time the image is captured, may be displaying an all-white background. The mobile device 104 may be, prior to the capture of the image, configured to display a predefined image (e.g., a lock screen image or a home screen image having at least all-white or high-intensity edges). In some cases, instead of configuring the mobile device 104 to display a predefined image, the display settings of the mobile device 104 may be configured to display an all-white or high-intensity background (e.g., such that at least the edges of the display screen are illuminated). As another example, the display screen, at the time the image is captured, may be displaying one or more on-screen objects in the foreground with an all-white or another bright-colored background. The system may be configured to cause the display screen to be in a calibration state that includes the display screen having such a predetermined output, or the display screen may be set to have such an output by either a human operator or the robotic arm selecting one or more options on the display screen (e.g., selecting an on-screen icon, opening a particular image file, or other action) that cause the display screen to have a desired output prior to calibration. The system may capture the image such that at the time the image is captured, at least the edges of the display screen are lit (e.g., such that the edges have the same color and/or intensity). Although in the example of FIG. 2, the system captures the image, in other examples, the system may instead receive the image of the mobile device 104 captured by another system.

In some embodiments, the system may set the lock screen of the mobile device 104 to a predetermined background, place the mobile device 104 in a state in which the lock screen is displayed on the display screen, and capture the image of the display screen of the mobile device 104 while the lock screen is displayed on the display screen. The lock screen of the mobile device 104 may be displayed on the display screen of the mobile device by, for example, pressing the home button (or another button) for turning on the display screen. Although not illustrated in FIG. 1, the system 100 may include one or more actuators for pressing the mechanical buttons provided on the mobile device 104. Although the lock screen is used as an example, the mobile device 104 may be placed in any other initial state in which the display screen displays any of the on-screen objects or images described above.

In some embodiments, the display screen may not be displaying anything (or turned off) at the time the image is captured. In some of such embodiments, the display screen of the mobile device 104 may be visually different from other portions of the mobile device 104 that are not part of the display screen (e.g., non-display screen portions). For example, the display screen (or the edges thereof) may be in a different color than such other portions of the mobile device 104 that are not part of the display screen.

At block 204, the system detects a plurality of contours in the image. For example, the system may perform the Canny edge operator on the image to detect a plurality of edges in the image, and subsequently identify a plurality of closed-loop objects by connecting different combinations of the detected edges. In other examples, other edge detection and contour detection methods may be used. In some embodiments, the system may perform one or more pre-processing operations, such as undistorting the image using a camera matrix. For example, one or more functions in the Open Source Computer Vision (OpenCV) library may be used to perform some or all of such undistorting, edge detection, contour detection, or other computer vision techniques described herein.

At block 206, the system filters the identified contours based on one or more threshold conditions. For example, the system may remove any contour that is smaller than a predefined threshold size. To do so, the system may create a bounding box around each contour, and for each contour, determine whether the corresponding bounding box satisfies one or more size thresholds. For example, the system may remove any bounding box that has a width that is smaller than a minimum width and/or a height that is smaller than a minimum height. Alternatively or additionally, the system may remove any bounding box that has a width that is greater than a maximum width and/or a height that is greater than a maximum height. The threshold conditions may be based at least in part on the distance between the camera 106 and the mobile device 104. In some embodiments, the ignoring or discarding of a given bounding box may be accomplished by tagging or marking the bounding box as not being a candidate for further processing (or conversely as marking the unfiltered bounding boxes as candidates for further processing), such that subsequent actions performed by the system with respect to one or more remaining bounding boxes are not performed with respect to the bounding box(es) filtered at block 206. Accordingly, removing or discarding a bounding box does not necessarily require deleting any data from memory or modifying any image data.

The minimum width, minimum height, maximum width, and/or maximum height may be specific to the particular mobile device 102 (or its associated screen size) depicted in the image. For example, the system may first determine the size thresholds (e.g., minimum width, minimum height, maximum width, and/or maximum height) based on the model number or other identifier associated with the mobile device 104, and apply the size thresholds on the bounding boxes. In some embodiments, the size thresholds are specific to the type of the mobile device 104 (e.g., smartphone, tablet, laptop, etc.). In other embodiments, the size thresholds are received (e.g., retrieved from remote or local storage) or inputted (e.g., by a human operator) via an interface provided by the system. In some embodiments, the size thresholds are not device-specific, and the same size thresholds are used regardless of the mobile device 104.

At block 208, the system identifies the bounding box corresponding to the display screen of the mobile device 104. In some embodiments, the filtering performed at block 206 eliminates all but one bounding box that corresponds to the display screen of the mobile device 104. In such embodiments, the system determines that the remaining bounding box corresponds to the display screen of the mobile device 104. In other embodiments, multiple bounding boxes may remain after the filtering performed at block 206. In such embodiments, the system may select one that is most likely to correspond to the display screen of the mobile device. For example, the system may select the bounding box that is closest to a predetermined location in the image. As another example, the system may select the bounding box that has the largest size. In yet another example, the system may receive a user selection of one of the bounding boxes via a user interface provided by the system.

In some embodiments, the mobile device 104 may include additional touch-sensitive regions that are not used to display information or do not include light emitting elements. In such cases, once the bounding box is selected, the bounding box is extended to include such additional touch-sensitive regions. For example, upon determining that the mobile device 104 includes such additional touch-sensitive regions (e.g., based on the model, manufacturer, or identifier associated with the mobile device 104), the system may extend the selected bounding box to include such additional touch-sensitive regions.

At block 210, the system determines the coordinate values of the bounding box corresponding to the display screen of the mobile device 104. For example, the system may determine a set of coordinate values of a pixel in the image that is included in the bounding box. The system may determine the set of coordinate values corresponding to any number of the corner pixels (e.g., bottom-left pixel, bottom-right pixel, top-left pixel, and/or top-right pixel). For example, the system may determine the x-coordinate value and the y-coordinate value of the pixel at the bottom-left corner of the bounding box. The determined coordinate values indicate the location of the pixel within the image captured or received at block 202.

As used herein, the phrase "set of coordinate values" may refer to a pair of coordinate values (e.g., the x-coordinate value and the y-coordinate value of a pixel in a 2-dimensional space, such as in an image captured by a camera), a group of three coordinate values (e.g., x-, y-, and z-coordinate values of a pixel in a 3-dimensional space), or a group of any number of coordinate values (e.g., including a single coordinate value) in any other coordinate system.

At block 212, the system calculates one or more transformation parameters to be used to convert a given set of coordinate values in a camera coordinate system to a corresponding set of coordinate values in a robotic arm coordinate system. In some embodiments, the system may treat a specific portion of the bounding box as a reference point for generating the transformation parameters. For example, the bottom-left corner of the bounding box may be set to (0, 0) in the robotic arm coordinate system, regardless of what the coordinate values of the pixel at the bottom-left corner of the bounding box are. For example, if the coordinate values of the pixel at the bottom-left corner of the bounding box is (300, 300), based on this rule, (300, 300) in the camera coordinate system would correspond to (0, 0) in the robotic arm coordinate system. Accordingly, the system may calculate transformation parameters such that applying the transformation parameters to (300, 300) in the camera coordinate system would result in (0, 0), which represents the set of coordinate values in the robotic arm coordinate system that corresponds to (300, 300) in the camera coordinate system. In some cases, the (0, 0) point in the robotic arm coordinate system may coincide with the actual physical limit of the robotic arm 108, where the robotic arm 108 is not physically capable of moving beyond the (0, 0) point (for example, to (−1, 0) or (0, −1)). Alternatively, the physical location corresponding to the bottom-left corner of the mobile device 104 may be set to (0, 0) in the robotic arm coordinate system, even if the robotic arm 108 is capable of moving beyond this (0, 0) point, for example, to (−1, 0) or (0, −1) in the robotic arm coordinate system. In such cases, the (0, 0) point in the robotic arm coordinate system may be a device-specific (0, 0) point specific to the mobile device 104. Such a device-specific (0, 0) point may be determined based on the distance in the image between the pixel at the bottom-left corner of the bounding box and a pre-positioned reference element (e.g., a red dot marking the physical movement range of the robotic arm 108) that corresponds to the "real" (0, 0) point (i.e., the physical limit of the robotic arm 108). For example, if the system determines that the pixel location of the bottom-left corner of the bounding box from the pre-positioned reference element is 30 pixels in the width direction and 50 pixels in the height direction. Assuming that the ratio (discussed in greater detail below) of the unit values in the camera coordinate system and the robotic arm coordinate system is 1:1, what used to be (30, 50) in the robotic arm coordinate system may be set to (0, 0), and the "real" (0, 0) point in the robotic arm coordinate system may be set to (−30, −50). Although the bottom-left corner is used as an example, any other corner or any other portion of the bounding box can be set to a specific set of coordinate values in the robotic arm coordinate system. In addition, although (0, 0) is used as an example reference point, the reference point can have any other coordinate values.

Further, prior to calculating the transformation parameters, the system may determine the ratio between the unit values in the camera coordinate system (e.g., pixels) and the unit values in the robotic arm coordinate system. For example, each pixel in the camera coordinate system may equal one, two, or any number of unit values in the robotic arm coordinate system. In other words, if the ratio between the unit values is 1:5, two objects in an image that are 100 pixels apart may be 500 units apart in the robotic arm coordinate system. As another example, if the ratio between the unit values is 300:1, two objects in an image that are 600 pixels apart may be 2 units apart in the robotic arm coordinate system. In the example described above, the pixel at the top-right corner of the bounding box may have coordinate values of (900, 1200), such that the bounding box has a width of 600 pixels (e.g., the difference between the x-coordinate values of the two pixels at the bottom-left and top-right corners) and a height of 900 pixels (e.g., the difference between the y-coordinate values of the two pixels). In this example, if the ratio of the unit values in the camera coordinate system to the unit values in the robotic arm coordinate system is 300:1, the bounding box would have a width of 2 units and a height of 3 units in the robotic arm coordinate system. In some embodiments, the system determines the ratio based on the distance between the camera 106 and the display screen of the mobile device 104. For example, the system may detect the distance using a sensor, and calculate the ratio as a function of the detected distance. Alternatively, the system may receive an indication of the distance via a user interface, and calculate the ratio as a function of the received distance. For example, increasing the distance between the camera 106 and the display screen of the mobile device 104 (e.g., from 15 cm to 30 cm) may decrease the ratio between the unit values in the camera coordinate system and the robotic arm coordinate system (e.g., from 15:1 to 10:1). These are example values, and the actual reduction in the ratio in response to an increase in the distance may be based on the specific camera and/or the setup of the camera-assisted robotic arm system shown in FIG. 1.

Using the reference point and the ratio, the system can determine transformation parameters for converting a set of coordinate values in the camera coordinate system to a corresponding set of coordinate values in the robotic arm coordinate system. For example, if the bottom-left corner of the bounding box having coordinate values of (300, 300) in the camera coordinate system is to be set to (0, 0) in the robotic arm coordinate system, the system may subtract 300 from each of the coordinate values in the set (300, 300) to arrive at (0, 0). Further, if the ratio of the unit values in the camera coordinate system to the unit values in the robotic arm coordinate system is 30:1, a bounding box having a width of 600 pixels and a height of 900 pixels should have a width of 20 units and a height of 30 units in the robotic arm coordinate system. Thus, the system may, after subtracting 300 from each of the coordinate values in a set, divide each of the resulting values by 30 to arrive at the coordinate values in the robotic coordinate system. In this example, the transformation parameters may be −300 (e.g., value to be added to each coordinate value) and 1/30 (e.g., value by which the result of the subtraction is to be multiplied).

At block 214, the system stores the calculated transformation parameters for future use. For example, the transformation parameters may be stored in local or remote storage. In some cases, the routine 200 is repeated for mobile devices other than the mobile device 104, and device-specific transformation parameters are stored for future use in connection with the respective device. In some embodiments, it may be advantageous to repeat the calibration routine whenever a mobile device is remounted in the mobile device mounting station 102 (due to, for example, the potential of a difference in mounting position relative to the previous mounting of the same device) or at periodic time intervals (due to, for example, the possibility of a human bumping into a component physically connected to mobile device mounting station 102 that causes movement of the mobile device 104, or gradual shifting of positions caused by repeated robotic arm movements). After the transformation parameters are stored, the routine 200 ends.

It will be understood that the blocks of the routine 200 may be combined, divided, or varied within the scope of the present disclosure. For example, although FIG. 2 is described with reference to a bounding box, the system may instead select one of the contours corresponding to the display screen of the mobile device 104 without first creating a bounding box fitted around such a contour. In such a case, the determined coordinate values may correspond to one or more pixels of the selected contour in the image. In some embodiments, before block 202, the system may cause mechanical actuators to perform one or more predefined actions on the mobile device 104 (e.g., to cause the display screen to display the lock screen).

Mobile Device Experiment Routine

Figure 3:
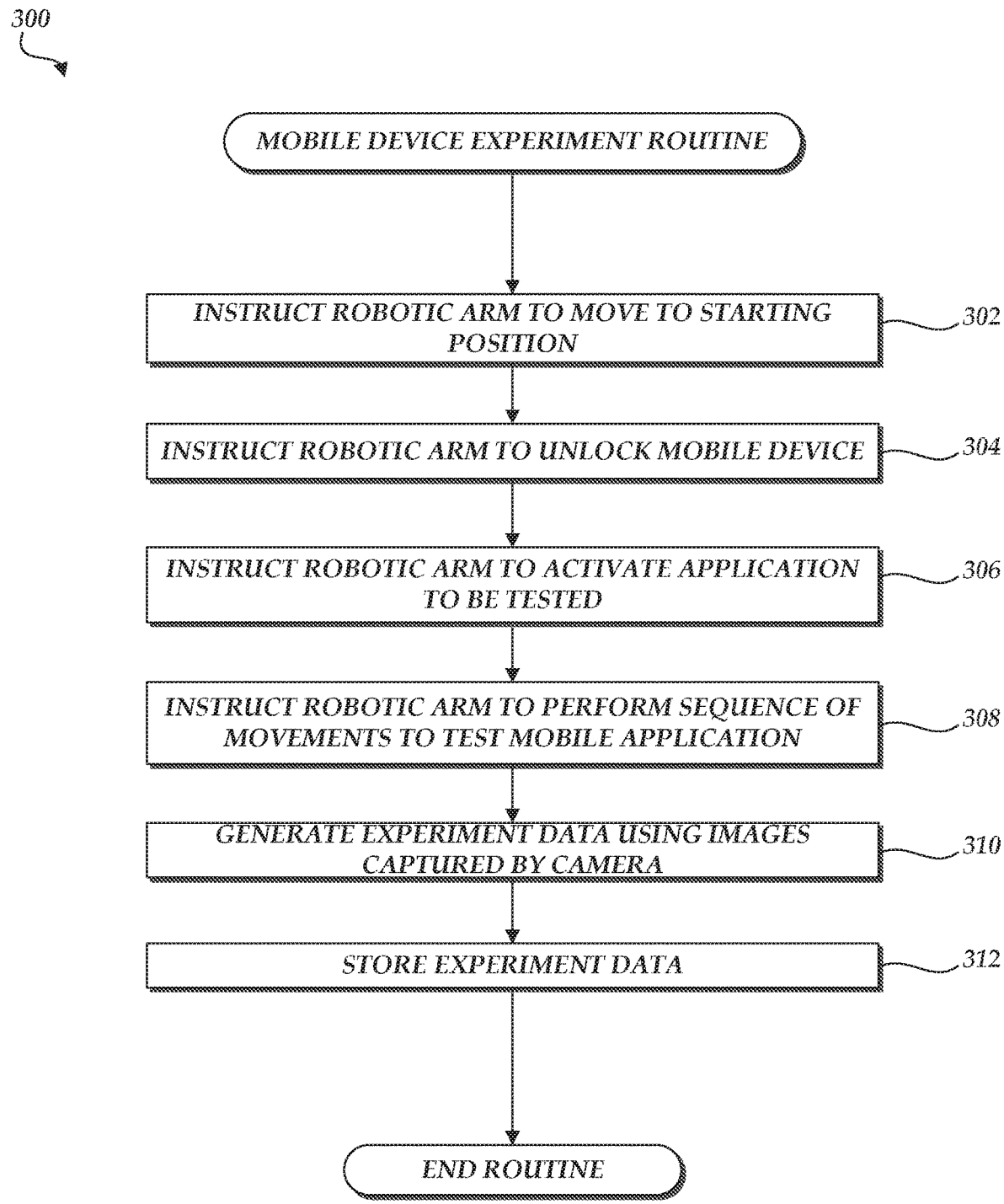
FIG. 3 is a flow diagram depicting a mobile device experiment routine in accordance with aspects of the present disclosure.

Turning now to FIG. 3, an example mobile device experiment routine 300 will be described. The example routine 300 may be carried out, for example, by the mobile device experiment platform 500 of FIG. 5 (or one or more components thereof), which will be described below. For convenience, the steps of the example routine 300 are described as being performed by a system.

At block 302, the system instructs the robotic arm 108 to move to a starting position associated with an experiment to be performed. For example, the experiment may be designed to test the hardware and/or software performance of the mobile device 104. The term "experiment" as used herein is intended to broadly refer to any of a variety of different tests or series of tests, and may include tests such as usability testing, speed of computing performance, quality assurance (such as checking for crashes, bugs or other errors), and/or many others depending on the embodiment. The system may determine the starting position based on a set of hard-coded coordinate values in the robotic arm coordinate system defined by the experiment. For example, the experiment may specify that the robotic arm is to be moved to (50, 50). Alternatively, the coordinate values of the starting position may be determined by the system dynamically. For example, the experiment may specify that the robotic arm is to be moved to the center of the display screen, and the system may perform one or more steps of the routine 200 of FIG. 2 to determine the exact coordinate values corresponding to the center of the display screen.

At block 304, the system instructs the robotic arm 108 to unlock the mobile device 104. For example, the system may cause the tip of the robotic arm 108 to touch and slide across the bottom of the display screen. As discussed above with reference to block 302, the coordinate values associated with unlocking the mobile device 104 may be hard-coded into the experiment or calculated dynamically based on one or more images captured by the camera 106. In some embodiments, performing a given robotic action, such as performing a "swipe" or touch and slide action, may include providing a starting coordinate position as input to a previously coded movement function. For example, a "swipe" function for a given device may include computer-executable instructions that, given a set of starting coordinates, cause the robotic arm to move to a corresponding starting position and then drag the tip of the robotic arm across the surface of the mobile device's screen at a set speed for a set distance before lifting the tip from the screen surface. In other embodiments, the distance may be detected dynamically based on image data from the camera 106 (such as by detecting a width of an on-screen control or other object).

At block 306, the system instructs the robotic arm 108 to activate a mobile application to be tested. The mobile application may be a video application, a music application, or any other application installed on the mobile device 104. As discussed above with reference to block 302, the coordinate values associated with activating the mobile application may be hard-coded into the experiment or calculated on the fly based on one or more images captured by the camera 106. For example, the system may determine the pixel location of an on-screen object depicted in the captured image that matches the icon associated with the specific mobile application to be tested, and convert the set of coordinate values of the on-screen object to a set of coordinate values in the robotic arm coordinate system. The system can cause the robotic arm 108 to move to a physical location corresponding to the set of coordinate values in the robotic arm coordinate system and touch the display screen of the mobile device 104 to activate the specific mobile application.

At block 308, the system instructs the robotic arm 108 to perform a predetermined sequence of movements to test the mobile application. For example, the experiment may specify a series of hard-coded movements to be performed by the robotic arm 108. In some cases, the experiment may specify the sets of coordinate values corresponding to various locations on the display screen to be touched by the robotic arm 108 (e.g., using a tip configured for touch-sensitive screens such as a capacitive touchscreen). Such hard-coded coordinate values specified by the experiment may be in the camera coordinate system. In such cases, the hard-coded coordinate values can be transformed according to the transformation parameters previously determined during the calibration routine 200. Once such hard-coded sets of coordinate values have been converted to corresponding sets of coordinate values in the robotic arm coordinate system, the system can instruct the robotic arm 108 to move to the sets of coordinate values in the robotic arm coordinate system. Alternatively, the experiment may specify camera-assisted movements based on the dimensions of the display screen (e.g., "touch the top-right corner of the display screen") or on-screen objects (e.g., "touch the icon that looks like X," "touch the button that reads Y," etc.). In some cases, the movements may include a combination of such (i) hard-coded movements specified using predefined coordinate values and (ii) camera-assisted movements based on the dimensions of the display screen or on-screen objects. Such camera-assisted movements are described below in greater detail with reference to FIG. 4.

At block 310, the system generates experiment data based on images captured by the camera 106 (or one or more frames of a video captured by the camera 106) during the experiment. For example, the system may analyze the sequence of images captured by the camera 106 during the experiment, and determine that the robotic arm 106 activated the mobile application at time $T_0$ and the mobile application finished loading at time $T_1$. By calculating the difference between time $T_1$ and time $T_0$, the system can determine how long the mobile device 104 took to finish loading the mobile application. The amount of time elapsed may be recorded as a data point in association with the mobile device 104 and/or the mobile application and used to compare the performance of the mobile device 104 and/or the mobile application to the performance of other devices/applications. At block 312, the system stores the generated experiment data. For example, the generated experiment data may be stored in local or remote storage. After the experiment data is stored, the routine 300 ends.

It will be understood that the blocks of the routine 300 may be combined, divided, or varied within the scope of the present disclosure. For example, one or more of blocks 302-306 may be omitted. As another example, instead of generating the experiment data, the images captured during the experiment may be stored or sent to another system for further processing and analysis. Although not shown in FIG. 3, the system may perform the routine 300 in response to a request to perform a given experiment on the mobile device 104.

Camera-Assisted Robot Arm Control Routine

Figure 4:
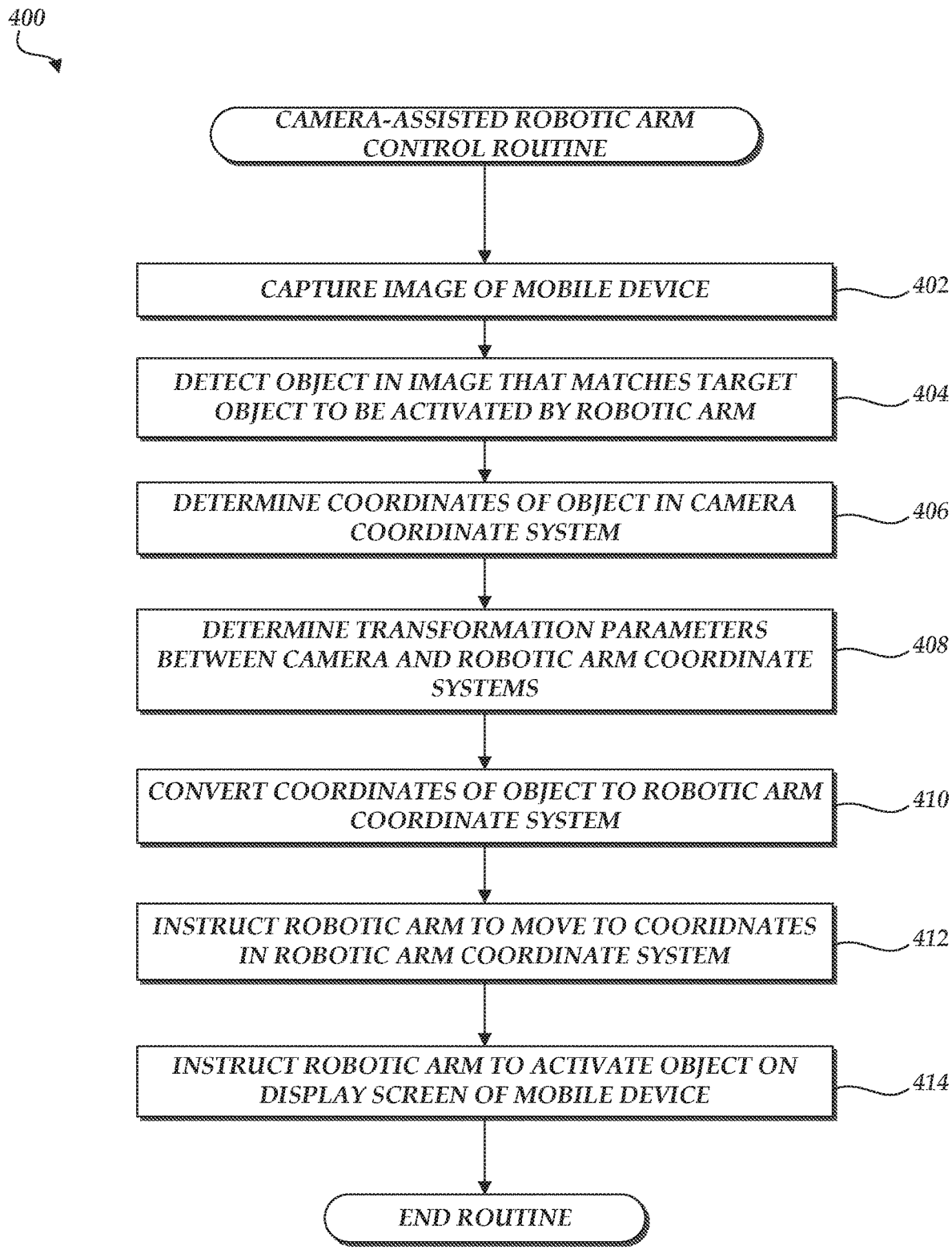
FIG. 4 is a flow diagram depicting a camera-assisted robotic arm control routine in accordance with aspects of the present disclosure.

Turning now to FIG. 4, an example camera-assisted robot arm control routine 400 will be described. The example routine 400 may be carried out, for example, by the mobile device experiment platform 500 of FIG. 5 (or one or more components thereof), which will be described below. For convenience, the steps of the example routine 400 are described as being performed by a system.

At block 402, the system captures an image of the mobile device 104 while the mobile device 104 is mounted in the mobile device mounting station 102. As discussed with reference to FIG. 2, the captured image may include a depiction of the display screen of the mobile device 104. In some embodiments, the system captures the image while the mobile device 104 is turned on and while the display screen of the mobile device 104 is displaying one or more on-screen objects or images.

At block 404, the system detects an object in the captured image that matches a target on-screen element to be activated by the robotic arm 108. For example, the target on-screen element may be an icon associated with a mobile application that is placed on the home screen of the mobile device 104. As another example, the target on-screen element may be a keyboard key icon of a specific letter (e.g., the "Y" key to be activated to provide a positive response to an on-screen question or a pop-up window, or any other key). The system may perform an image comparison to determine whether the image of the display screen captured by the camera 106 includes an object that matches the target on-screen element. For example, the system may perform edge detection and contour detection, and compare each of the detected contours to a predefined image data associated with a mobile application icon, keyboard keys, or any other on-screen elements. In some embodiments, the system sends the captured images to an image classifier trained to identify such target on-screen elements. In some embodiments, the target on-screen element is a selectable option presented within a pop-up window. Such a selectable option can be detected and activated such that the pop-up window can be closed (causing code executing on the mobile device 104 to remove the window from the display screen).

A block 406, the system determines a set of coordinate values associated with the object in the camera coordinate system. For example, the set of coordinate values associated with the object can be the set of coordinate values of the pixel at the center of the object in the captured image. In some cases, the system may determine the set of coordinate values of the pixel at a location within the object other than the center.

At block 408, the system determines one or more transformation parameters between the camera coordinate system and the robotic arm coordinate system. For example, the system may calculate the transformation parameters as described above with reference to FIG. 2. Alternatively, the system may retrieve previously stored transformation parameters for converting a given set of coordinate values in the camera coordinate system to a corresponding set of coordinate values in the robotic arm coordinate system.

At block 410, the system converts the set of coordinate values associated with the object to a corresponding set of coordinate values in the robotic arm coordinate system. For example, the system can apply the transformation parameters to the set of coordinate values associated with the object to determine the corresponding set of coordinate values in the robotic arm coordinate system. Applying the transformation parameters may include (i) adding an offset value to (or subtracting an offset value from) one or more of the coordinate values in the set, and/or (ii) multiplying or dividing one or more of the coordinate values in the set by an offset value. In some cases, applying the transformation parameters results in a linear transformation of the coordinate values in the set.

At block 412, the system instructs the robotic arm 108 to move to the corresponding set of coordinate values in the robotic arm coordinate system. At block 414, the system instructs the robotic arm 108 to activate the on-screen element displayed on the display screen of the mobile device 104.

It will be understood that the blocks of the routine 400 may be combined, divided, or varied within the scope of the present disclosure. For example, moving the robotic arm 108 at block 412 may also cause the robotic arm 108 to activate the on-screen element. Alternatively, moving the robotic arm 108 at block 412 causes the robotic arm 108 to hover over the on-screen element displayed on the display screen of the mobile device 104, and the system further instructs the robotic arm 108 to touch the on-screen element at block 414.

Mobile Device Experiment Platform

Figure 5:
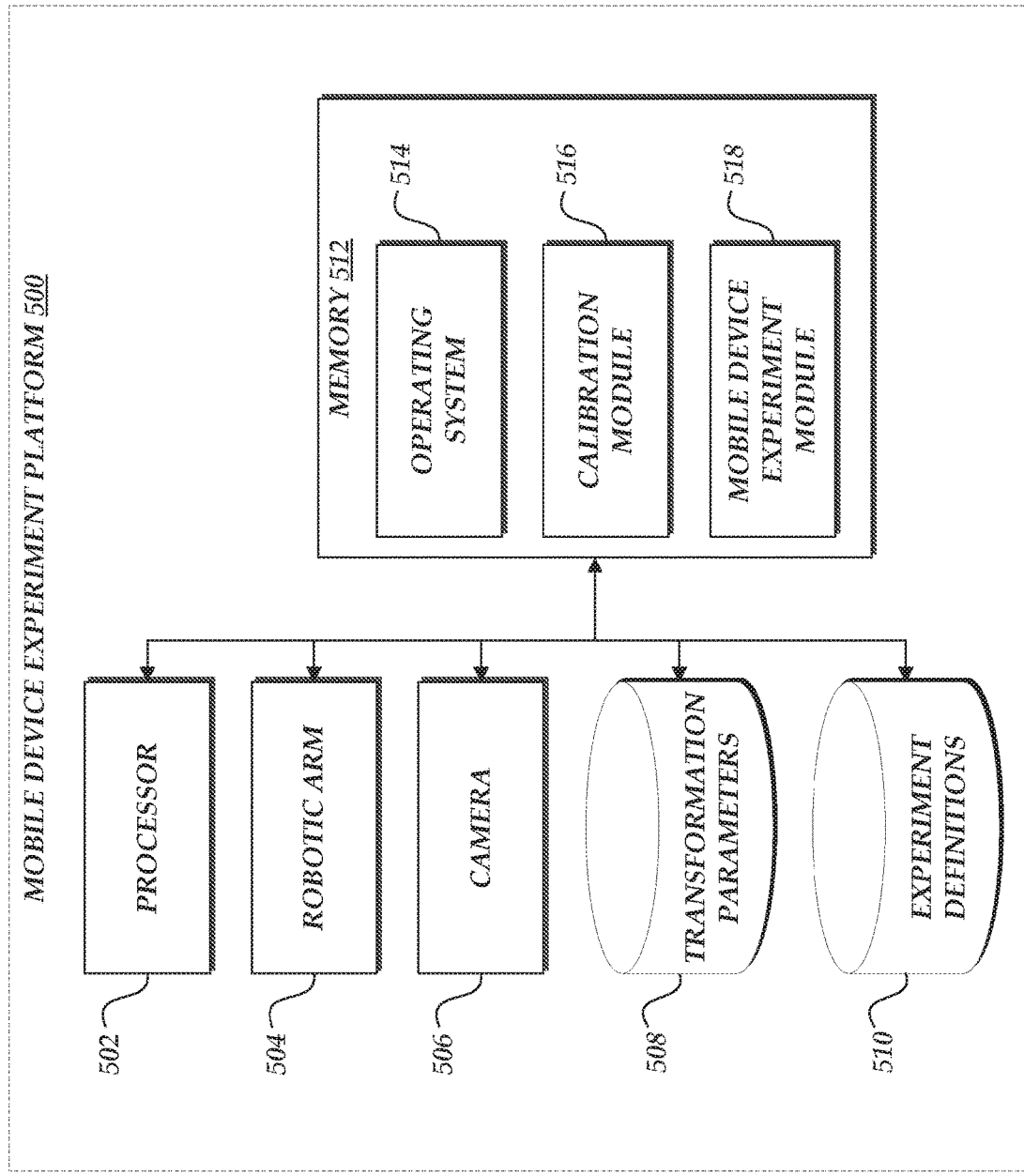
FIG. 5 is a block diagram illustrating components of a mobile device experiment platform in accordance with aspects of the present disclosure.

FIG. 5 is a block diagram of an example mobile device experiment platform 500, which includes an arrangement of computer hardware and software components that may be used to implement aspects of the present disclosure. The mobile device experiment platform 500 may include many more (or fewer) elements than those shown in FIG. 5. It is not necessary, however, that all of these elements be shown in order to provide an enabling disclosure.

As illustrated, the mobile device experiment platform 500 includes a processor 502, a robotic arm 504, a camera 506, a data store 508 for storing transformation parameters, and a data store 510 for storing experiment definitions, all of which may communicate with one another by way of a communication bus. Although not shown in FIG. 5, the mobile device experiment platform 500 may include a network interface for providing connectivity to one or more networks or computing systems and, as a result, enabling the mobile device experiment platform 500 to receive and send information and instructions from and to other computing systems or services. Although the mobile device experiment platform 500 includes both the data store 508 and the data store 510, in some embodiments, the mobile device experiment platform 500 may include a single data store that stores both the transform parameters and the experiment definitions.

The processor 502 may communicate to and from a memory 512. The memory 512 may contain computer program instructions (grouped as modules or components in some embodiments) that the processor 502 may execute in order to implement one or more embodiments of the present disclosure. The memory 512 generally includes RAM, ROM, and/or other persistent, auxiliary, or non-transitory computer-readable media. The memory 512 may store an operating system 514 that provides computer program instructions for use by the processor 502 in the general administration and operation of the mobile device experiment platform 500. The memory 512 may further store specific computer-executable instructions and other information (which may be referred to herein as "modules") for implementing aspects of the present disclosure. For example, the memory 512 may include a calibration module 516, which may perform various operations with regard to calibrating the robotic arm 504 with respect to the camera 506 as described herein. For example, the calibration module 516 may include computer-executable instructions and other information for performing the steps illustrated in FIG. 2. The memory 512 may also include a mobile device experiment module 518, which may be executed by the processor 502 to perform various operations, such as those operations described with reference to FIGS. 3 and 4.

While the operating system 514, the calibration module 516, and the mobile device experiment module 518 are illustrated as distinct modules in the memory 512, in some embodiments, the calibration module 516 and the mobile device experiment module 518 may be incorporated as modules in the operating system 514 or another application or module, and as such, separate modules may not be required to implement some embodiments. In some embodiments, the calibration module 516 and the mobile device experiment module 518 may be implemented as parts of a single application.

OTHER CONSIDERATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A system for conducting robot-assisted experiments on mobile devices, the system comprising:
   a mobile device mounting station configured to physically hold a mobile device having a touch-sensitive display screen;
   a camera configured to capture images of the mobile device while the mobile device is mounted in the mobile device mounting station;
   a gantry arm having a tip configured to contact the touch-sensitive display screen of the mobile device;
   one or more memories configured to store at least a first experiment definition including instructions for conducting a first experiment on the mobile device using the gantry arm while the mobile device is mounted in the mobile device mounting station; and
   one or more processors in communication with the one or more memories and configured to:
      cause the mobile device to display a predefined image on the touch-sensitive display screen such that at least edges of the touch-sensitive display screen are illuminated;
      receive an image of the mobile device captured by the camera, the image including a depiction of at least the illuminated edges of the touch-sensitive display screen of the mobile device;
      identify a plurality of contours included in the image;
      identify a plurality of bounding boxes based on the plurality of contours;
      identify, based on one or more threshold conditions, a first bounding box corresponding to the edges of the touch-sensitive display screen from the plurality of bounding boxes, the first bounding box defined by one or more sets of coordinate values in the camera coordinate system;
      determine, based on the one or more sets of coordinate values in the camera coordinate system, one or more transformation parameters configured to convert a set of coordinate values in the camera coordinate system to a corresponding set of coordinate values in a gantry arm coordinate system;
      store the one or more transformation parameters for use in an experiment conducted on the mobile device;
      receive a request to conduct the first experiment on the mobile device;
      cause the gantry arm to move to a starting position associated with the first experiment; and
      cause the gantry arm to perform a plurality of movements defined by the first experiment definition, the plurality of movements comprising at least a first movement configured to unlock the mobile device and a second movement configured to activate a mobile application installed on the mobile device, wherein the plurality of movements include causing the tip of the gantry arm to touch at least one specific location on the touch-sensitive display screen of the mobile device.

2. The system of claim 1, wherein the one or more processors are further configured to:
   receive a plurality of additional images captured by the camera during the first experiment;
   detect an object, in at least a first image of the plurality of additional images, that matches a target object to be activated by the gantry arm according to the first experiment definition;
   determine a first set of coordinate values associated with the object in the camera coordinate system;
   transform, based on the one or more transformation parameters, the first set of coordinate values to a second set of coordinate values in the gantry arm coordinate system;
   cause the gantry arm to move to a position corresponding to the second set of coordinate values; and
   cause the gantry arm to activate the object displayed on the touch-sensitive display screen of the mobile device that matches the target object.

3. The system of claim 2, wherein the one or more processors are further configured to generate one or more hardware performance metrics of the mobile device based on the plurality of additional images.

4. The system of claim 1, wherein the one or more processors are further configured to discard one or more of the plurality of contours that have at least one of (i) a width that is less than a minimum width specified by the one or more threshold conditions, (ii) a height that is less than a minimum height specified by the one or more threshold conditions, (iii) a width that is greater than a maximum width specified by the one or more threshold conditions, or (iv) a height that is greater than a maximum height specified by the one or more threshold conditions.

5. A computer-implemented method for performing robot-assisted actions, the computer-implemented method comprising:
   receiving a first image of a mobile device captured by a capture device, the first image including at least a depiction of a display screen of the mobile device;
   identifying a plurality of contours included in the first image;

identifying a plurality of bounding boxes based on the plurality of contours;
identifying, based on one or more threshold conditions, a first bounding box corresponding to the display screen from the plurality of bounding boxes, the first bounding box defined by one or more sets of coordinate values in a first coordinate system associated with the capture device;
determining, based on the one or more sets of coordinate values in the first coordinate system, one or more transformation parameters configured to convert a set of coordinate values in the first coordinate system to a corresponding set of coordinate values in a second coordinate system associated with a robotic arm; and
causing the robotic arm to perform a plurality of movements that cause a portion of the robotic arm to touch one or more specific locations on the display screen of the mobile device, wherein the one or more specific locations are determined based at least in part on the one or more transformation parameters.

6. The computer-implemented method of claim 5, further comprising causing the portion of the robotic arm to touch a specific object displayed on the display screen of the mobile device, wherein a location of the specific object is determined based at least in part by applying the one or more transformation parameters to a first set of coordinate values in the first coordinate system, the first set of coordinate values corresponding to a location at which the specific object appears in a second image captured by the capture device.

7. The computer-implemented method of claim 5, further comprising discarding one or more of the plurality of contours based on the one or more threshold conditions such that the only remaining contour of the plurality of contours represents an outline of the display screen featured in the first image.

8. The computer-implemented method of claim 5, further comprising extending the first bounding box to include a predefined additional area associated with the mobile device, the predefined additional area corresponding to at least part of a touch-sensitive portion of the display screen.

9. The computer-implemented method of claim 5, further comprising:
receiving a plurality of additional images captured by the capture device subsequent to capturing the first image; and
generating, based on at least some of the plurality of additional images, a latency value associated with performing the plurality of movements.

10. The computer-implemented method of claim 5, further comprising determining one or more additional transformation parameters based at least in part on a second image depicting another mobile device, wherein said another mobile device has a display screen size that is different from that of the mobile device.

11. The computer-implemented method of claim 5, further comprising:
receiving a second image captured by the capture device;
detecting an object in the second image that matches a target object to be activated by the robotic arm;
determining a first set of coordinate values associated with the object in the first coordinate system;
transforming, based on the one or more transformation parameters, the first set of coordinate values to a second set of coordinate values in the second coordinate system; and
causing the robotic arm to activate the object displayed on the display screen that matches the target object.

12. The computer-implemented method of claim 11, wherein the object is a depiction of a user interface element displayed on the display screen, the method further comprising capturing the second image while the user interface element is displayed on the display screen.

13. The computer-implemented method of claim 12, further comprising detecting the object by at least one of: comparing at least a portion of the second image to a previously stored image of the target object, or providing at least a portion of the second image to an image classifier trained to identify the target object.

14. The computer-implemented method of claim 5, wherein the robotic arm is a gantry arm.

15. The computer-implemented method of claim 5, further comprising:
receiving a second image captured by the capture device;
detecting, based on image analysis of the second image, a window displayed on the display screen of the mobile device, the window comprising a selectable option for closing the window;
determining a display location of the selectable option in the second coordinate system based at least in part on the one or more transformation parameters; and
causing the robotic arm to touch the display location of the selectable option.

16. A non-transitory physical computer storage medium storing computer-executable instructions that, when executed by one or more processors of a mobile device experiment platform, configure the one or more processors to:
identify a plurality of objects included in a first image, the plurality of objects including a first object that corresponds to a display screen;
discard one or more objects of the plurality of objects that do not satisfy one or more size thresholds;
select the first object from the plurality of objects based on the first object satisfying the one or more threshold conditions, the first object associated with at least a set of coordinate values in a first coordinate system;
determine, based on the set of coordinate values in the first coordinate system, one or more transformation parameters indicative of a relationship between the first coordinate system and a second coordinate system different from the first coordinate system;
convert a first set of coordinate values in the first coordinate system to a second set of coordinate values in the second coordinate system using the one or more transformation parameters; and
cause a robotic arm to touch a specific location on the display screen corresponding to the second set of coordinate values in the second coordinate system.

17. The non-transitory physical computer storage medium of claim 16, wherein the second set of coordinate values in the second coordinate system corresponds to a second object included in a second image captured at a specific time period, wherein the second object is a depiction of a user interface element displayed on the display screen at the specific time period.

18. The non-transitory physical computer storage medium of claim 16, wherein the instructions further configure the one or more processors to:
detect a second object in a second image depicting the display screen, wherein the second object is a depiction of a user interface element displayed on the display screen; and cause the robotic arm to activate the user interface element displayed on the display screen.

19. The non-transitory physical computer storage medium of claim 16, wherein the instructions further configure the one or more processors to:
 cause the robotic arm to move to a reference position associated with a corner of the display screen; and
 calibrate the second coordinate system such that the reference position is associated with a set of predefined coordinate values in the second coordinate system.

20. The non-transitory physical computer storage medium of claim 16, wherein the first object is a bounding box corresponding to the display screen.

* * * * *